US012726819B2

(12) United States Patent
Salmela et al.

(10) Patent No.: US 12,726,819 B2
(45) Date of Patent: Sep. 1, 2026

(54) METHODS AND ENTITIES FOR END-TO-END SECURITY IN COMMUNICATION SESSIONS

(71) Applicant: Telefonaktiebolaget LM Ericsson (publ), Stockholm (SE)

(72) Inventors: Patrik Salmela, Espoo (FI); Mohit Sethi, Helsinki (FI); Andrey Shorov, Vantaa Uusimaa (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 327 days.

(21) Appl. No.: 18/565,611

(22) PCT Filed: Jun. 16, 2021

(86) PCT No.: PCT/EP2021/066320
§ 371 (c)(1),
(2) Date: Nov. 30, 2023

(87) PCT Pub. No.: WO2022/262975
PCT Pub. Date: Dec. 22, 2022

(65) Prior Publication Data

US 2024/0259804 A1 Aug. 1, 2024

(51) Int. Cl.
*H04W 12/08* (2021.01)
*H04W 12/041* (2021.01)
(Continued)

(52) U.S. Cl.
CPC ......... *H04W 12/08* (2013.01); *H04W 12/041* (2021.01); *H04W 12/0431* (2021.01); *H04W 12/06* (2013.01)

(58) Field of Classification Search
CPC ............... H04W 12/08; H04W 12/041; H04W 12/0431; H04W 12/06; H04W 12/033;
(Continued)

(56) References Cited

U.S. PATENT DOCUMENTS

2009/0110196 A1* 4/2009 Tsai .................... H04W 12/062 380/258
2018/0184297 A1* 6/2018 Mohamed ......... H04W 36/0038
(Continued)

FOREIGN PATENT DOCUMENTS

WO 2020030248 A1 2/2020

OTHER PUBLICATIONS

International Search Report and Written Opinion of the International Searching Authority, PCT/EP2021/066320, mailed Mar. 7, 2022, 14 pages.

(Continued)

*Primary Examiner* — Kenneth T Lam
(74) *Attorney, Agent, or Firm* — Weisberg I.P. Law, P.A.

(57) ABSTRACT

Methods for enabling end-to-end security for a communication session between a user equipment (UE), registered with a Mobile Network Operator (MNO) network, and a gateway and/or service of an external network are disclosed. In the methods additional keys are generated based on keys obtained in a secondary authentication between the UE and an entity and/or service. An entity, a UE, computer programs and computer program products are also disclosed.

14 Claims, 4 Drawing Sheets

(51) Int. Cl.
*H04W 12/0431* (2021.01)
*H04W 12/06* (2021.01)

(58) Field of Classification Search
CPC ............. H04W 12/062; H04W 12/082; H04W 12/069; H04W 12/043; H04L 63/0478; H04L 63/0272; H04L 63/205
See application file for complete search history.

(56) References Cited

U.S. PATENT DOCUMENTS

| | | | | |
|---|---|---|---|---|
| 2018/0227759 | A1* | 8/2018 | Liu | H04W 76/50 |
| 2020/0267554 | A1* | 8/2020 | Faccin | H04W 12/06 |
| 2021/0165905 | A1* | 6/2021 | Bertin | G06F 16/1824 |
| 2021/0168594 | A1* | 6/2021 | Wu | H04W 88/16 |
| 2021/0218744 | A1* | 7/2021 | Gandhi | H04L 63/062 |
| 2021/0306853 | A1* | 9/2021 | Gundavelli | H04W 12/06 |
| 2022/0007180 | A1* | 1/2022 | Liao | H04L 67/14 |
| 2022/0386123 | A1* | 12/2022 | Sangai | H04L 63/18 |
| 2024/0031807 | A1* | 1/2024 | Gundavelli | H04W 12/0471 |

OTHER PUBLICATIONS

3GPP TR 33.899 V1.3.0 (Aug. 2017); 3rd Generation Partnership Project; Technical Specification Group Services and System Aspects; Study on the security aspects of the next generation system (Release 14), 605 pages.

* cited by examiner

METHODS AND ENTITIES FOR END-TO-END SECURITY IN COMMUNICATION SESSIONS

CROSS REFERENCE TO RELATED APPLICATIONS

This application is a 35 U.S.C. § 371 national stage application of PCT International Application No. PCT/EP2021/066320 filed on Jun. 16, 2021, the disclosure and content of which is incorporated by reference herein in its entirety.

TECHNICAL FIELD

Embodiments presented herein relate to methods, an entity, a user equipment, computer programs, and computer program products for end-to-end security for a communication session.

BACKGROUND

A 5G Core Network (5GC) is the heart of a 5G mobile network. The 5GC can be interconnected with external data networks, such as the Internet, and with external private networks of e.g. enterprises. In the latter case, typically, not everyone is allowed access, and there is often a secure network protocol suite, e.g. Internet Protocol Security (IPsec), between the 5GC network and the external private network. The IPsec, or some other secure tunnel, authenticates and encrypts packets of data, which enables both endpoints to trust each other based on negotiated and trusted mutually authenticated security means. The private network is then configured to trust traffic coming from the IPsec tunnel established with the trusted 5GC.

In order to limit User Equipments (UEs) to those allowed to send data through the IPsec tunnel, the 5GC can assign the external private network a Data Network Name (DNN), which may be internal or private. Public DNNs are also used, e.g. DNN for internet access is typically "internet". The DNN can be seen as an identifier of the network that the externally facing interface of a User Plane Function (UPF) connects to for a specific Packet Data Units (PDU) session. The UPF can serve multiple DNNs. The DNN is bound to the PDU session established for a UE and/or subscription (in the following denoted UE/subscription). The UE/subscription can establish a PDU session only to those DNNs that are configured for that particular subscription, i.e. the 5GC performs access control based on the subscription information and only allows subscriptions configured with a specific DNN to create a PDU session for the DNN.

In order to further enhance the access control for the DNN, the external network can also be involved through a Secondary Authentication (SA). When enabled for the DNN, the 5GC will not allow establishing of a PDU session with the specific DNN unless also the SA has been successfully performed towards the external network. The SA is basically an Extensible Authentication Protocol (EAP) method exchange between the UE and an Authentication, Authorization and Accounting (AAA) server. The AAA server is typically located in the external network, and uses external network credentials of the UE, i.e. only UEs that also possess valid credentials for the external network can establish a PDU session with the DNN. The EAP exchange is run with a Session Management Function (SMF) in the 5GC acting as an EAP authenticator and (typically) the AAA server in the external network acting as an EAP server.

With 5G the concept of private 5G networks has been introduced, the 5G technology allowing the building of such private 5G networks. These non-public networks (NPN) can be deployed in different ways. A standalone NPN (SNPN) is basically a standalone 5G network, that is not relying on network functions provided by a Public Land Mobile Network (PLMN), but possibly utilizing Radio Access Network (RAN) of the PLMN. The entity operating the SNPN may, for instance, be an enterprise. Alternatively, the NPN may be deployed by at least partly utilizing the infrastructure of the PLMN, and such NPN is called a public network integrated NPN (PNI-NPN). In this case the subscription credentials are managed by the PLMN. The PNI-NPN may be deployed as a network slice in the PLMN network or as an external data network in which some of the NFs of the NPN can be run.

In the case of a PNI-NPN in which the NPN is deployed as an external data network, in addition to a primary registration/authentication, a SA may be used for authenticating and authorizing the UE access to the NPN via the PLMN. If network slicing is used, a Network Slice-Specific Authentication and Authorization (NSSAA) may be used for authorizing access to the NPN slice. The NSSAA may, for instance, be performed using an external AAA server and an EAP-based authentication.

5G Local Area Network (LAN) type of services improve regular LAN with 5G capabilities, such as performance, long-distance access, mobility, security etc., and allow a restricted set of UEs to communicate amongst each other. In providing 5G LAN service, a 5G System (5GS) supports optimized routing by enabling support for local switching at the UPF without having to traverse the data network for UE-UE communication when the same UPF serves the both UE(s). However, the 5G LAN may have a DNN associated with it, i.e., the SA may be performed to authenticate and authorize the UE accessing such DNN since no 5G-LAN specific authentication or authorization has been defined [3GPP TS 23.501, 33.501].

Despite the fact that cellular networks seem like an impressive way to build enterprise networks, there are several drawbacks. For instance, security concerns related to a hop-by-hop security that is inherent to the cellular network design are often considered as a disadvantage. Such security concerns would be very costly to overcome.

The 5G network provides a communication security for user traffic that comprises multiple hops as defined in [TS33.501]. The hops may involve: UE-to-gNB (gNodeB) wherein user plane (UP) security is used, gNB-to-UPF wherein network domain security (NDS-IP, usually an IPsec tunnel) is used, and an optional secure tunnel (e.g. IPsec) that may be established between the UPF and the external network. Modern enterprise networks using 5G infrastructure would require setting up a secure end-to-end connection between endpoints and data networks. This in turn requires that the enterprises buy, set up, and maintain additional security services, such as a Virtual Private Network (VPN), on top of the 5G infrastructure in order to guarantee the end-to-end security between an endpoint and a data network. Such over-the-top solutions would entail more handshakes, additional negotiations, additional networks, more resources for encryption and entails still additional costs for both set-up and maintenance.

Hence, there is a need for improved methods and means for enabling enterprises to set up private networks in a secure yet cost-efficient way.

SUMMARY

An objective of embodiments herein is to enable a less complex, yet efficient end-to-end security for e.g. private enterprises wanting to provide its employees with access to external networks and/or its corporate network.

Another objective of embodiments herein is to enable such end-to-end security in a cost-efficient way.

According to a first aspect there is presented a method for enabling end-to-end security for a communication session between a user equipment registered with a Mobile Network Operator (MNO) network, and a gateway and/or service of an external network. The method is performed in an entity of the external network and comprises: performing a secondary authentication procedure with the UE for authorizing access to the external network; selecting, for the UE, one or more of gateway(s) and service(s) for the communication session; generating additional key material, K, based on key material generated in the secondary authentication; and providing the additional key material to the one or more of the gateway(s) and the service(s), for establishment of an end-to-end secure channel between the UE and the gateway(s) and/or service(s) for the communication session.

According to a second aspect there is presented an entity for enabling end-to-end security between a UE and an endpoint of an external network. The entity is configured to: perform a secondary authentication procedure with the UE for authorizing access to the external network; select, for the UE, one or more of gateway(s) and service(s) for the communication session; generate additional key material, K, based on key material generated in the secondary authentication; and provide the additional key material to the one or more of the gateway(s) and the service(s), for establishment of an end-to-end secure channel between the UE and the gateway(s) and/or service(s) for the communication session.

According to a third aspect there is presented a computer program for enabling end-to-end security for a communication session between a UE registered with an MNO network, and a gateway and/or service of an external network. The computer program comprises computer program code which, when run on processing circuitry of an entity, causes the entity server to perform a method according to the first aspect.

According to a fourth aspect there is presented a method for obtaining end-to-end security for a communication session to a gateway and/or service of an external network. The method is performed in a UE registered with a Mobile Network Operator (MNO) network and comprises: receiving, from an entity of the network, an identity request for a secondary authentication procedure for access to the external network; performing, in response to the identity request, a second authentication procedure with an entity of the external network; generating additional key material, K, based on key material generated in the secondary authentication; and establishing, using the additional key material, K, an end-to-end secure channel to the gateway and/or service for the communication session.

According to a fifth aspect there is presented a user equipment for obtaining end-to-end security for a communication session to an endpoint of an external network. The UE is configured to: receive, from an entity of the network, an identity request for a secondary authentication procedure for access to the external network; perform, in response to the identity request, a second authentication procedure with an entity of the external network; generate additional key material, K, based on key material generated in the secondary authentication; and establish, using the additional key material, K, an end-to-end secure channel to the gateway and/or service(s) for the communication session.

According to a sixth aspect there is presented a computer program for end-to-end security between a UE and a gateway of an external network. The computer program comprises computer code which, when run on processing circuitry of the UE, causes the UE to perform a method according to the third aspect.

According to a seventh aspect there is presented a computer program product comprising a computer program according to at least one of the third aspect and the sixth aspect and a computer readable storage medium on which the computer program is stored. The computer readable medium could be a non-transitory computer readable storage medium.

Advantageously, the embodiments herein, enable establishment of an end-to-end secure channel to be provided in a highly cost-efficient way, involving reduced set-up costs by removing the need to set up additional security solution on top of 5G infrastructure. Further, signaling overhead is reduced by the embodiments herein.

Advantageously, the embodiments herein enable reduced costs for security issues, by providing security means allowing a reduced number of handshakes, less negotiations and resource allocations compared to currently existing solutions.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Briefly, according to various aspects of the present teachings, a Secondary Authentication (SA) is used for more than just authorizing a user equipment (UE) to access a data network identified by a Data Network Name (DNN). Key material that is generated during such a SA is further used for creating secure end-to-end sessions between the UE and gateway(s)/service(s) in an external data network.

Figure 1:
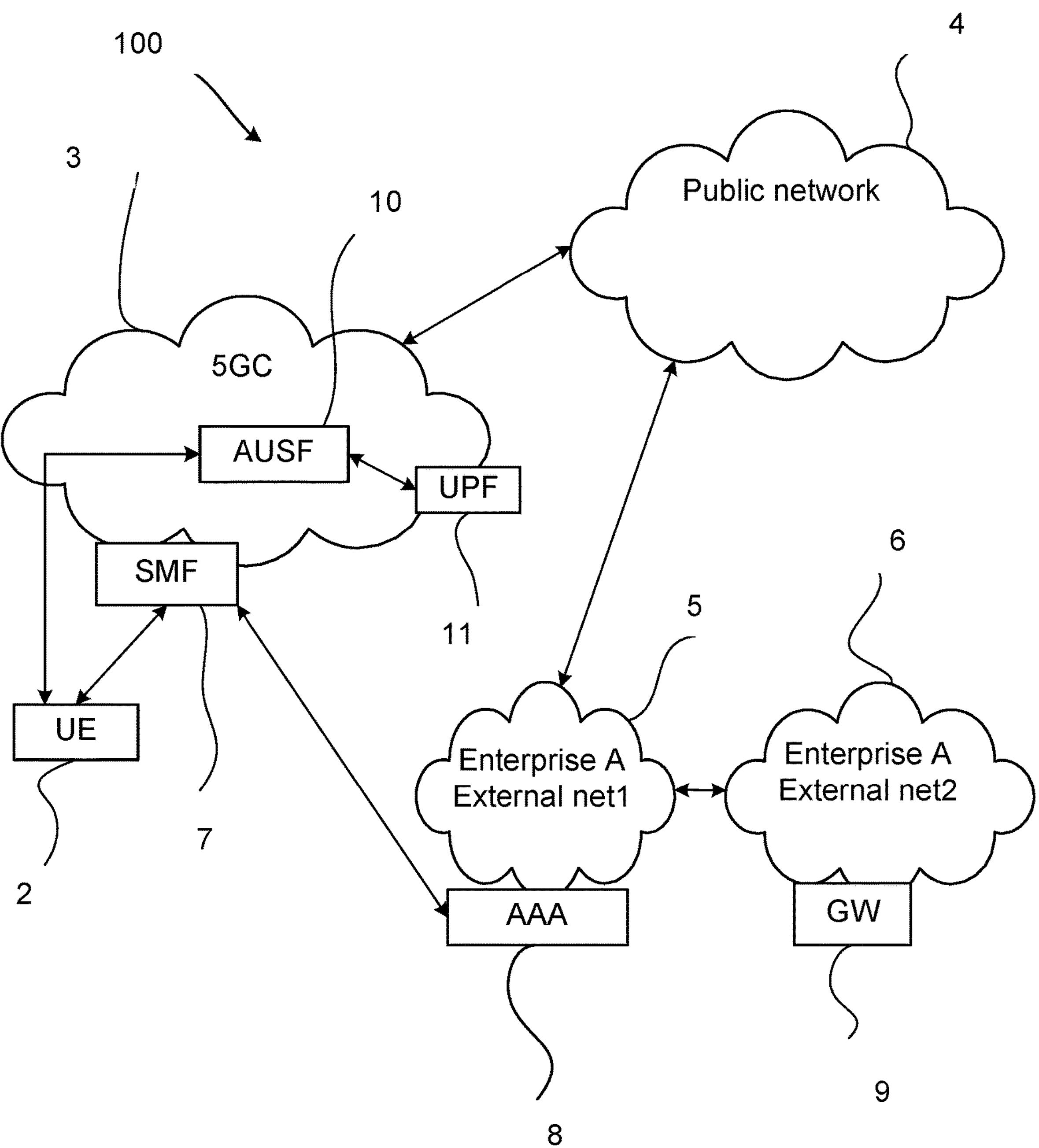
FIG. 1 is a schematic diagram illustrating a network according to an embodiment.

FIG. 1 is a schematic diagram illustrating a system 100 in which methods in various embodiments may be implemented. A 5GC 3 is illustrated, of which three functional units 7, 10 and 11 of the 5GC are illustrated. A first functional unit is a core network node, in particular a Session Management Function (SMF) core network node 7. The SMF core network node 7 is in the following denoted simply SMF node 7. The SMF node 7 handles control plane (CP) functions and supports session management. The session management, in turn, comprises session establishment, modification and release, allocation and management of UE IP addresses, termination of Non-access stratum (NAS) signalling related to session management, to mention a few of its tasks. A second functional unit is an Authentication Server Function (AUSF) unit 10. The AUSF unit 10 performs authentication with a UE 2. A third functional unit of the 5GC is a User Plane Function (UPF) unit 11. The UPF unit 11 handles packet routing and forwarding, performs packet inspection, handles Quality of Service (QoS) and external PDU sessions for interconnecting data networks in a 5G architecture. It is noted that the 5GC 3 may comprise still further functional units, for instance, a Policy Control Function (PCF) and/or an Access and Mobility Management Function (AMF).

The UE 2 may be allowed to access an external private network, e.g. enterprise A to get access to a first external private network 5 and/or a second external 6 of the enterprise A. The UE 2 has a subscription with a Mobile Network Operator (MNO), wherein the subscription may be configured with a DNN (e.g. Enterprise A) associated with the external private networks 5, 6 (in the following denoted external networks). In addition, the UE 1 may be configured with credentials for the external network 5, 6. The operator of the external network 5, 6 and the MNO may have an agreement for providing the DNN and optionally for establishing a secure channel between MNO network and external network such that there is (e.g.) and IPsec tunnel established between them. The external network/enterprise may in fact consist of multiple networks that are controlled by the same entity, e.g. a regional enterprise network. The network(s) may implement software defined network (SDN) in order to, for instance, configure what resources are available for various connecting clients and/or sessions and/or for when to connect to the network(s) via specific gateways (GWs). In the FIG. 1 the enterprise A is shown to have two separate external networks 5, 6, but the enterprise may have only a single external network or more than two. The external networks 5, 6 may comprise an AAA server 8 and/or a GW 9, and the AAA server 8 and the GW 9 may be placed in the same external network 5, 6.

Figure 2:
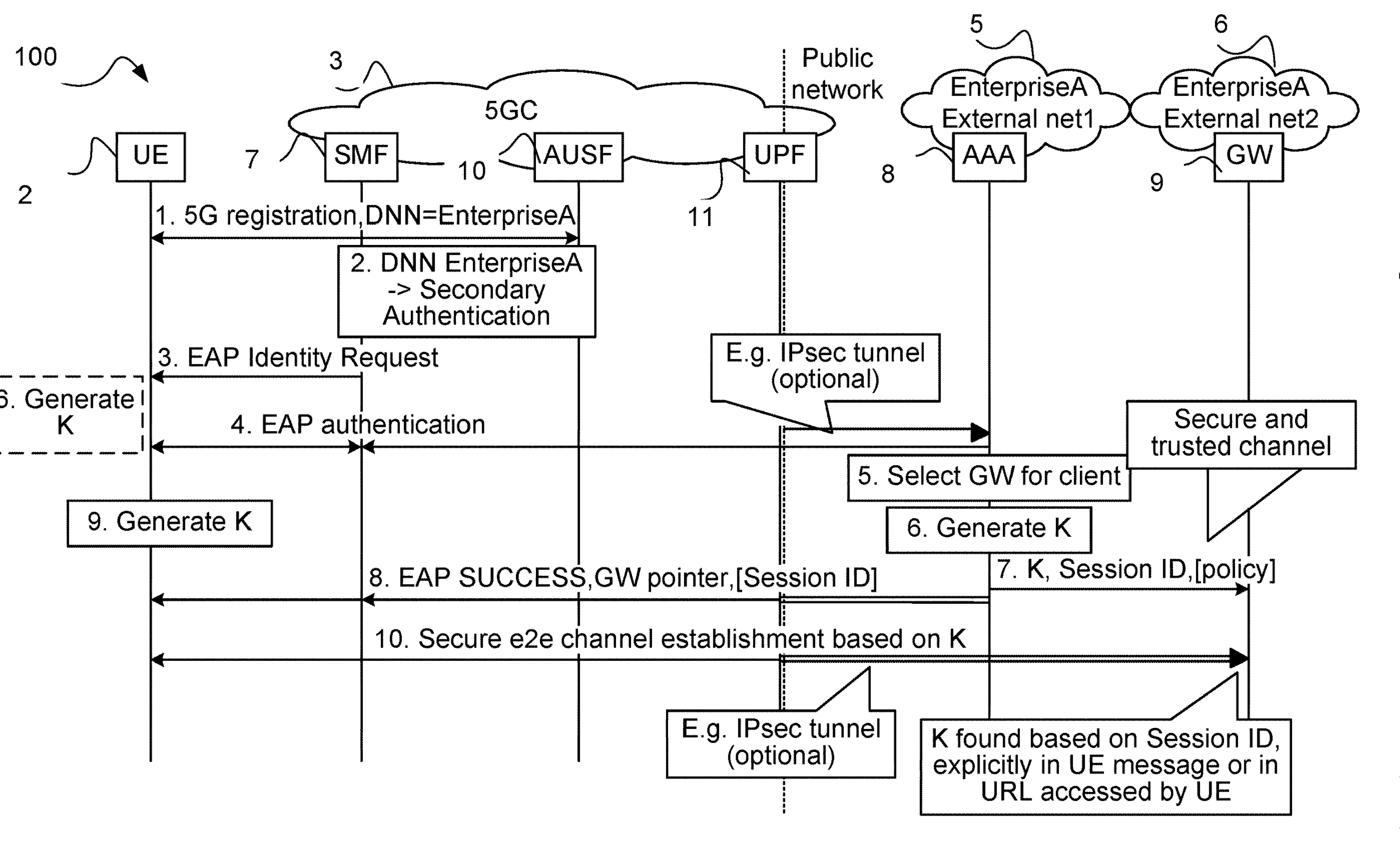
FIG. 2 is a signalling diagram according to embodiments.

FIG. 2 is a signalling diagram according to embodiments.

At double-headed arrow 1, the UE 2 registers with the 5GC 3, and authenticates with the AUSF 10 thereof. After registration, a PDU session establishment procedure follows between the UE and the SMF node 7. In this procedure, the UE 2 may (optionally) indicate a DNN (e.g. "Enterprise A") that it wishes to use for the PDU session. In other embodiments, the 5GC 3 may instead select DNN for the UE based on a DNN that is configured for the subscription of the UE 2. Flow then continues to box 2.

In box 2, the 5GC 3 notices that the UE PDU session is using a DNN that requires a secondary authentication with an AAA server 8 of the external network 5, 6. A secondary authentication procedure is therefore initiated by the SMF node 7. Flow then continues to arrow 3.

At arrow 3, the SMF node 7 sends an EAP identity request towards the UE 2. Flow then continues to double-headed arrow 4.

At double-headed arrow 4, the UE 2 acts as EAP peer and, depending on the credentials, runs a suitable EAP method with the external AAA server 8. The SMF node 7 acts as a EAP authenticator and sends messages to the external AAA server 8 via the UPF 11. There may be an IPsec tunnel, or other secure channel, between the UPF 11 and the AAA server 8 of the enterprise A (illustrated by a double-headed arrow between these entities 11, 8. This is however optional and may be omitted, e.g. if security requirements do not mandate secure connection between the 5GC and an external data network. Flow then continues to box 5.

In box 5, the AAA server 8, e.g. an EAP server, selects one or more gateways (GWs) and/or one or more services for the UE 2. The selection may be based on one or more policies, relevant for the Enterprise A. Flow then continues to box 6.

In box 6, the UE 2 and the AAA server 8 (herein exemplified by the EAP server), are both in possession of Master/Main Session Key (MSK) and Extended Master/Main Session key (EMSK), derived from some EAP based method. In particular, the MSK and the EMSK are the results of the EAP authentication. The AAA server 8 generates one or more new key(s) for the selected one or more gateway(s) or service(s). The new key(s) K(s) are generated from the MSK and/or from the EMSK. Flow then continues to arrow 7.

At arrow 7, the AAA server 8 (exemplified here as EAP server) forwards the key(s) K to the selected gateway(s) 9 and/or services of the Enterprise A. The key(s) may be accompanied by policy information if the enterprise A has such information, and an identifier for the key. When a user connects to the desired GW or service, he gives the identifier. When the gateway(s) and/or service(s) receives such identifier, it is able to locate the corresponding key, and may then establish a secure end-to-end session with the UE. Regardless of whether the AAA server 8 and the GW 9 are in the same or in different external networks 5, 6, the communication of the generated key K to the GW 9 needs to be secured.

In some embodiments of implementing step 7, the GW 9 may receive policy information regarding how to treat the session that has been established using the key K. The policy information may, for instance, comprise information limiting access to certain services or resources in the network or information on lifetime limits for the session. The external network may use SDN techniques for dynamically managing the network for different sessions.

It is noted that the above step, described in relation to arrow 7, may be performed in parallel (or essentially simultaneously) with the following step, described in relation to arrow 8. In other embodiments, these steps (arrow 7 and arrow 8) may be performed in the reverse order.

At arrow 8, the AAA server 8 (exemplified by the EAP server) communicates a pointer of the selected gateway(s) or service(s) to the UE 2 via SMF node 7 and includes potential session identifier(s). Such pointers may, for instance, be IP address(es) and/or Fully Qualified Domain Name (FQDNs). If a session ID is not included, a username of the user connecting to the enterprise network may instead be used as session ID when establishing a connection. In such case it is the username that is forwarded as session identifier in the step described in relation to arrow 7.

In this example the parameters (pointer(s), session identifier(s)) are piggybacked in an EAP SUCCESS message. The information may alternatively be exchanged over an EAP-Request, EAP-Response, EAP-Notification Request, or EAP Notification Response messages. The identifier(s) and pointers may also, in other embodiments, be merged into an Uniform Resource Locator (URL), e.g. in the form www.gw.com/[ID]. Flow then continues to box 9.

In box 9, the UE 2 generates the same key(s) K that the AAA server 8 (e.g. EAP) generated in the step described in relation to box 6. However, in other embodiments, this generation may instead already have been done, e.g. when performing the steps described in relation to box 6, if all data required for the Key Derivation Function (KDF) is known by the UE 2 at that stage. Flow then continues to double-headed arrow 10.

At double-headed arrow 10, the UE 2 and the GW 9 use the key(s) K for creating a secure channel between themselves. The GW 9 is aware of which key to use based on the identifier (received earlier, see arrow 7).

From FIG. 2 it can be seen that the connection between the UPF 11 of the 5GC 3 and the AAA server 8 of the first external network 5 of enterprise A (with DNN Enterprise A) as well as of the gateway 9 of the second external network 6 (also with DNN External Net2) in external network may be protected by, for instance, IP sec. Such security is not always needed when implementing embodiment according to the present teachings. This is the case since the herein suggested solution results in a secure end-to-end connection.

Although not being compulsory, the IPsec tunnel may add still an additional layer of security. For example, the AAA server 8 and the GW 9 may be configured to only allow new connection attempts from a pre-configured and trusted 5GC 3 (UPF 11 thereof). This will facilitate blocking of random incoming connections from other entities in the internet. However, since the AAA server 8 and/or GW 9 only allows connections from pre-configured trusted entities this means that e.g., a user connected to the internet from, for instance, a hotel Wireless LAN (WLAN), would not be able to connect to the AAA server 8 and/or the GW 9, at least to this specific AAA server 8 and/or GW 9. A separate AAA server and/or GW may then be used when connecting through other than a pre-defined 5GC. This makes it possible to have different security policies depending on how a client connects to the external network 5, 6. The UE message through the 5GC 3 to the AAA server 8 and/or GW 9 would thus arrive through a trusted and secure channel, the external network/AAA/GW may then already have some trust for the message, since only subscriptions with the specific MNO, that are additionally configured for this specific DNN, and that have successfully performed the SA, would be able to send a message through the IPsec tunnel.

In addition to using SA for DNN access, SA may also be applied e.g. in scenarios where the external Data Network (DN) is a PNI-NPN and wherein accessing the DNN of the DN requires a SA. In such case, if using the presented solution, the result is an end-to-end secure channel from the UE 2 to the external DN. This means that the PLMN serving the NPN would not be able to access the plain text traffic of the UE 2. In contrast, using prior art it might (at least theoretically) be possible to access the plain text traffic in gNB and UPF. Further, a 5G LAN may also use the herein presented solution when SA is used, again providing end-to-end security from a UE to a physical part (external DN) of the enterprise LAN to which the 5G LAN UE connects. Furthermore, if network slice-specific authentication and authorization (NSSAA) is performed using an external AAA server, and the network slice is used for connecting to an external (private) DN, the same solution may be applied to the EAP based NSSAA with the external AAA server. This would not be necessary if the use of DNN also requires SA, in which case the herein presented solution could be applied there instead.

While FIG. 2 focuses on a use case of establishing a shared key between a UE and a specific GW 9, the AAA server 8 (e.g. EAP server) may generate multiple keys for multiple GWs and/or services. Secondary authentication utilizes EAP for authenticating the UE 2 and the AAA server 8. In the following, details and considerations regarding EAP use in the present solution are given.

The EAP method should ideally hide the actual identifier, used in the external network 5, 6, from the 5G system (5GS). Examples of protocols that hide the identity comprise EAP-TLS 1.3 and EAP-TTLS, although various other may be used in the herein presented methods.

The key K is obtained from the MSK or the EMSK that are available for the UE 2 and the AAA server 8 after the EAP authentication. In its simplest form, the key K may be the MSK or the EMSK or a subset of the bytes containing the MSK or the EMSK.

In other embodiments, the key K may be derived from the MSK or the EMSK by passing them through a key derivation function (KDF). When using a KDF, the AAA server 8 and the UE 2 may also bind keys to specific GWs and/or service(s) by including information about the GWs such as, for instance, the domain name, IP or IP address. This may allow the AAA server 8 to precompute keys for several GWs and deliver a different key to each GW of the enterprise network 5, 6. The UE 2 may then generate a key for any GW by doing similar computations with the key K and the GW information. An advantage of the AAA server 8 precomputing and providing keys to several GWs, is that the UE 2 is able to immediately connect to any of these GWs as they already have the key. Otherwise, i.e. if the AAA server 8 has not communicated GW specific keys to all GWs, when the UE connects to a GW that does have a key, the GW would have to request the key from the AAA server 8. In cases wherein the UE 2 connects to a GW and/or service that the AAA server 8 has not communicated to the UE 2, and thus not shared a key with, the GW and/or service may optionally query the AAA server 8 based on the identifier received from the UE 2. The AAA server 8 may then decide if the UE 2 is allowed to access the GW and/or service, and if so, generate a key for it and share it to the GW and/or service. Typically, the AAA server 8 would not allow for additional services when it communicates the allowed services to the UE 2, but for large networks to pre-generate all keys and distributing them might be sub-optimal, in which case the GW(s) and/or service(s) may instead query the AAA server 8.

The UE 2 may not know which GW it should connect to. If the enterprise has several GWs in different geographical locations, it may be desirable that the UE 2 uses the closest GW in order to obtain, for instance, improved performance. The AAA server 8 may, in some instances, communicate the GW information to the UE 2 after or along with the EAP authentication. The GW information may, for example, be sent as a payload in the EAP-Success message after authentication. In other embodiments, the GW information may be sent in EAP-Request/EAP-Response or EAP-Notification Request/EAP-Notification Response messages as part of the EAP method used for authentication. The information may be protected with intermediate or final keys (such as MSK/EMSK) resulting from the EAP authentication.

The GW information may be a simple IP address and/or and URL. It may also comprise an identifier which the UE 2 should provide to the GW 9 when setting up the end-to-end secure session. The identifier may be appended/prepended to the URL. If no identifier is provided to the UE 2 the user identifier in the external network may be used as identifier when setting up the session. Receiving the GW URL (and, optionally, the key identifier) may act as a trigger for the UE 2 to connect to the external network 5, 6 through the indicated GW 9, similar to a HTTP redirect message.

When the UE 2 connects via its home network, i.e. is not roaming, it accesses the DN identified by DNN via the local UPF 11. The external network 5, 6 thereby knows, at least to some degree, where the UE 2 is located. That is, the external network 5, 6 knows that the UE 2 is within a coverage of the 5GC through whose UPF 11 the EAP messages are being exchanged. However, when the UE 2 is roaming and connected via a visited network, the traffic also typically exits the 5G System via the UPF of the home operator (home routed), unless Local BreakOut (LBO) is used. In LBO data traffic is routed directly from the Visited Network (i.e. from the Visited PLMN) to the data network, while the authentication and handling of subscription data is handled in the Home Network (in HPLMN). In the home routed case the SMF used in the SA is the SMF in the home network, while in local breakout scenarios it is the SMF in the visited network.

If LBO is used either the visited operator knows and serves the same DNN as the home operator, or the DNN is not known. If the DNN is known, the herein provided solution (flow), would work just as in a non-roaming scenario, except that the 5GC 3 aiding the UE 2 to do the SA is the visited network and not the home network. If DNN is not known to the visited network, it either does not allow establishing of a PDU session or it inquires the home network for help (i.e. similar to the home routed case) and thus no local breakout is performed for that specific DNN. If the visited network does not support DNN and does not ask for help by the home network, the UE 2 might still try to authenticate with the external data network 5, 6 over the Internet.

In practice, there may be a specific network slice that the UE 2 uses to reach the DNN/external AAA. In this case, even if VPLMN supports LBO, the network slice would be requested and used and would be routed to HPLMN. If LBO is used, there may then be a separate network slice used for obtaining LBO access, which could be used for accessing the GW 9 indicated by the AAA server 8, wherein the GW indication is received via the UPF/DNN in the HPLMN.

In order to aid the external AAA server to make policy decisions about the UE 2, the actual location of the UE 2 can be an important piece of information. In non-roaming and local breakout scenarios the location of the UE 2 is given by the SMF node 7 or UPF 11 exchanging EAP messages with the AAA server 8. For the home routed roaming scenario, including when a network slice to HPLMN is used even when VPLMN supports LBO as described above, the location is hidden from the AAA server 8 as it sees the traffic as coming from the home network. Whenever a UE or subscription is roaming, the home network learns the Serving Network Name (SNN) of the visited network. The SNN contains Mobile Network Code (MNC) and Mobile Country code (MCC), i.e. network and country codes of the visited network. The UE 2 also knows it since it has selected which visited network to attach, based on a list of roaming partners of the home network. Thus, the UE 2 can include this information in one of the EAP messages sent to the AAA server 8. In some embodiments, the EAP authenticator located in the home network may also include this information outside the EAP tunnel, i.e., inside the lower layer carrying the EAP message, e.g. in RADIUS/DIAMETER attributes. A malicious UE 2 could have an incentive to spoof this information, so the home network would be a better choice for providing the information to the AAA server 8.

In the following specific methods and means are presented and which may be implemented based on the herein provided teachings.

Figures 3, 4:
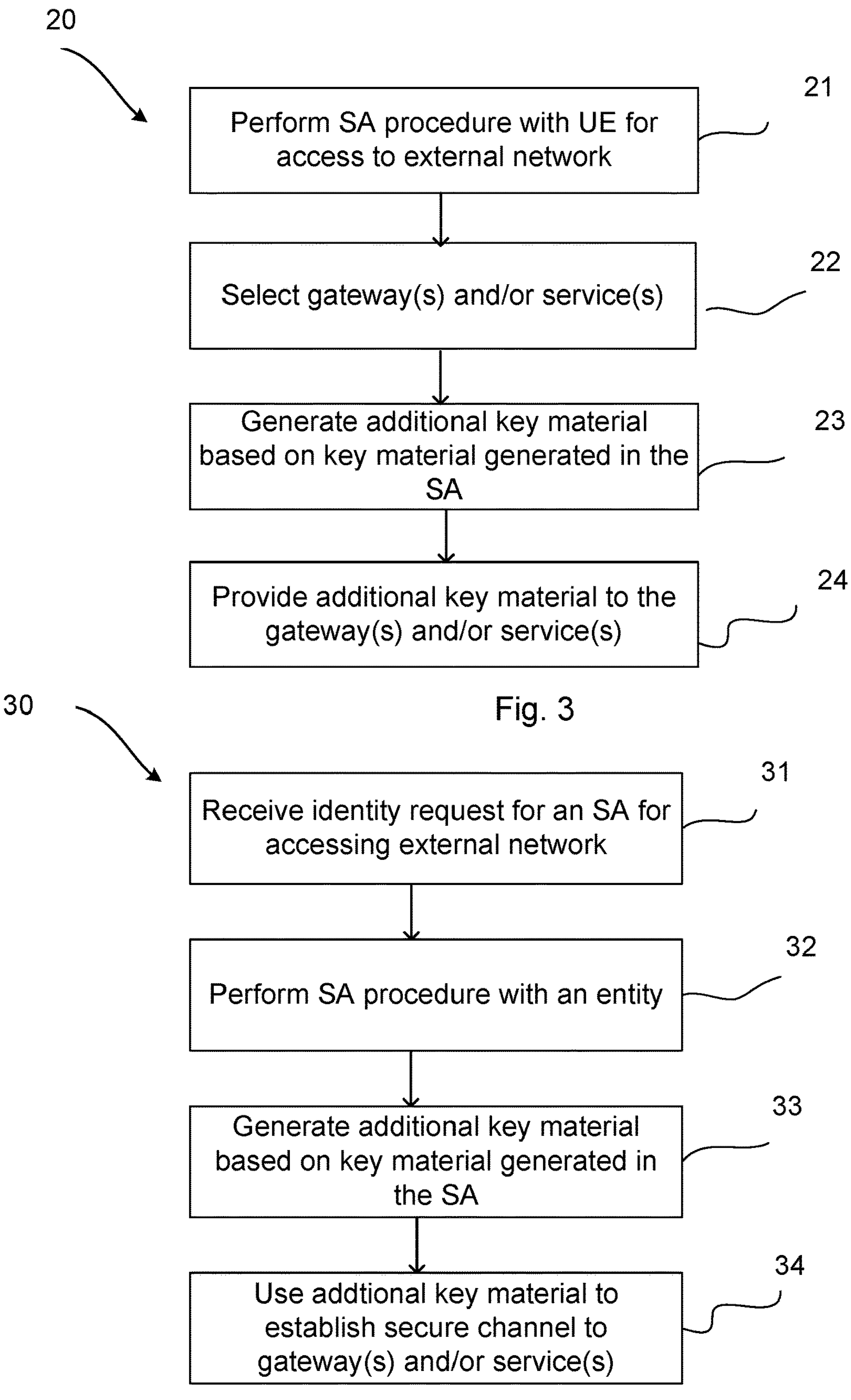
FIG. 3 is a flow chart of methods according to embodiments.
FIG. 4 is a flow chart of methods according to embodiments.

FIG. 3 is a flow chart of methods according to various embodiments. A method 20 is provided for enabling end-to-end security for a communication session between a user equipment (UE) 2 registered with a Mobile Network Operator (MNO) network 3 and a gateway 9 of an external network 5, 6. In some cases the secure session is just to the gateway 9, behind which there are services that can be reached without key material, while in some cases some services might require key material. The communication session may, for instance, be communication channel. It is noted that a Packet Data Unit (PDU) session (in 3GPP) identifies a connection between a UE and an external data network, the endpoint of which is at the User Plane Function (UPF). The endpoint(s) of the communication session in the present method 20 is, for instance, a gateway 9 of an external network 5, 6.

The method 20 is performed in an entity 8 of the external network 5, 6. The method 20 comprises performing 21 a secondary authentication procedure with the UE 2 for authorizing access to the external network 5, 6.

The method 20 comprises selecting 22, for the UE 2, one or more of gateway(s) 9 and service(s) for the communication session. The UE 2 may be provided with one or more gateways 9 and/or one or more services, e.g. services in an intranet.

The method 20 comprises generating 23 additional key material, K, based on key material generated in the secondary authentication.

The method 20 comprises providing 24 the additional key material to the one or more of the gateway(s) 9 and the service(s), for establishment of an end-to-end secure channel between the UE 2 and the gateway(s) 9 and/or service(s) for the communication session. If a secure communication session is to be set up with e.g. a gateway 9 and a particular service, the service may be such that it can be reached without key material. That is, the additional key material that is needed is the one for establishing the secure channel between the UE 2 and the gateway 9, while there is no need for additional key material for the service. In other cases, both the gateway 9 and the service have security requirements, and in such cases additional key material is provided also for the service. Different gateways 9 and services will typically require different key material to be provided. The UE 2 would then derive corresponding (different) keys to use towards the gateway 9 and the service. Different gateways and services will typically get different key material, i.e. the step of providing 24 requires different keys to be provided to each of the one or more of the gateway(s) and the service(s).

It is noted that the steps may be performed in another order than the indicated. For instance, the second key material may be generated before the selection of the endpoint 9 and/or the service.

The provided method 20 comprises a number of advantages. For instance, the enterprise wanting to set up a private network is, by means of the provided methods, alleviated from the need to buy, set up and maintain additional security services, such as VPN, on top of existing 5G infrastructure to guarantee end-to-end security between an endpoint and a data network. The methods enable the establishment of an end-to-end secure channel, or at least session credential, based on the existing 5G procedures. End-to-end session key can be kept out of LI (Lawful Interception), thereby enabling to have 5G-based true end-to-end security to, for instance, corporate networks.

By deriving additional key material from the secondary authentication, a UE is enabled to establish an end-to-end secure connection to the external private network, at highly reduced costs for the enterprise.

While 5G networks provide a secure connection, some corporations might still find the hop-by-hop nature of 5G connectivity to be an issue, especially if they intend to use the connection for business-critical data. The methods presented herein removes such security implications of the hop-by-hop nature, i.e. wherein the integrity- and confidentiality protection is hop-by-hop.

Further, the methods enable for the external network to apply policy rules for a communication session and also to select suitable gateways and services. For example, the gateway and service may be selected based on location of the UE and load of the gateway.

While there might be cost reductions, owing to (possibly) not needing as much infrastructure to support the secure connections, an important advantage is that signalling overhead is reduced and there might be less credentials needed to be handled by the enterprise. According to the various embodiments disclosed herein one set of credentials and authentication/key agreement may suffice for a client, while if a separate VPN would also be used, in addition to SA, then there would typically be a different set of credentials and negotiation for that.

In an embodiment, the method 20 comprises providing, to the UE 2, a pointer to the one or more of the gateway(s) 9 and the service(s) for the communication session.

In variations of the above embodiments, the method 20 comprises considering policy information relating to the UE 2 before authorizing access to the external network 5, 6. For instance, the corporation may have rules regarding which UEs are allowed to connect to the external network from abroad.

In variations of the above embodiments, the method 20 comprises denying the UE 2 access to the external network 5 if the policy information indicates that the UE 2 violates one or more restrictions relating to the access.

In a variation of the above embodiment, the method 20 comprises providing one of: complete access, limited access and Internet access based on the policy information.

In various embodiments, the generating 23 the additional key material comprises generating second key material for the gateway(s) 9 and generating third key material for the service(s) based on the key material generated in the secondary authentication.

In a variation of the above embodiment, the second key material and the third key material are based on key material generated in the secondary authentication. A key derivation function in the entity 8 for deriving the second and the third key material may use some additional input in order to generate unique keys for the gateway(s) and/or service(s). Such additional input may, for instance, comprise gateway name, gateway identifier, service name or service identifier.

In various embodiments, the method 20 comprises providing, to the one or more of the gateway 9 and the service, an identifier for selection of a correct key for establishing the secure end-to-end communication session to the UE 2.

In an embodiment, the performing 21 of the secondary authentication procedure comprises hiding the identifier from the MNO network 3.

In various embodiments, the secondary authentication comprises a 5G secondary authentication procedure, such as an Extensible Authentication Protocol (EAP) based authentication method.

In various embodiments, the first key material comprises a Master/Main Session Key (MSK), and an Extended Master/Main Session Key (EMSK).

FIG. 4 is a flow chart of methods according to embodiments. A method 30 is provided for obtaining end-to-end security for a communication session to a gateway 9 and/or service of an external network 5, 6. The method 20 is performed in a user equipment, UE, 2 that is registered with a Mobile Network Operator (MNO) network 3. The method 30 comprises receiving 31, from a core network node 7 of the MNO network 3, an identity request for a secondary authentication procedure for access to the external network 5, 6. The method 30 comprises performing 32, in response to the identity request, a second authentication procedure with an entity 8 of the external network 5, 6. The method 30 comprises generating 33 additional key material, K, based on key material generated in the secondary authentication. The method 30 comprises establishing 34, by using the additional key material, K, an end-to-end secure channel to the gateway 9 and/or service(s) for the communication session. It is noted that the UE may obtain information from external network about GW's and services that is can connect to, e.g. IP/URL etc.

In an embodiment, the method 30 comprises providing the entity 8 of the external network 5, 6 with current location information for the UE.

In another embodiment, a Key Derivation Function is used in the generation 33 of the additional key material, K.

Figure 5:
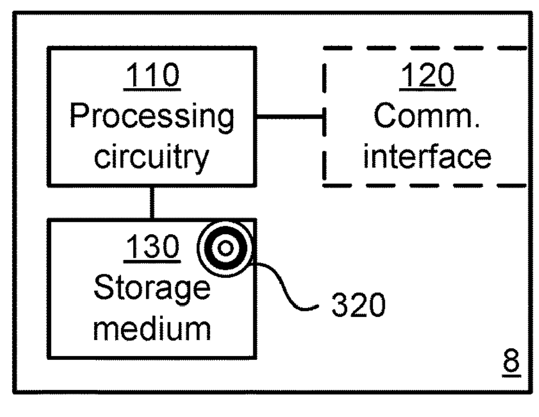
FIG. 5 is a schematic diagram showing functional units of an entity according to an embodiment.

FIG. 5 schematically illustrates, in terms of a number of functional units, the components of an entity 8 according to an embodiment. Processing circuitry **11*o* is provided using any combination of one or more of a suitable central processing unit (CPU), multiprocessor, microcontroller, digital signal processor (DSP), etc., capable of executing software instructions stored in a computer program product 300 (as in FIG. 9), e.g. in the form of a storage medium 130. The processing circuitry 110** may further be provided as at least one application specific integrated circuit (ASIC), or field programmable gate array (FPGA).

Particularly, the processing circuitry **11*o* is configured to cause the entity 8 to perform a set of operations, or steps, as disclosed above. For example, the storage medium 130 may store the set of operations, and the processing circuitry 11*o* may be configured to retrieve the set of operations from the storage medium 130 to cause the entity 8** to perform the set of operations. The set of operations may be provided as a set of executable instructions. The processing circuitry 11*o* is thereby arranged to execute methods as herein disclosed.

The storage medium 130 may also comprise persistent storage, which, for example, can be any single one or combination of magnetic memory, optical memory, solid state memory or even remotely mounted memory.

The entity 8 may further comprise a communications interface 120 for communications with other entities, nodes, functions, and devices of the system 100. As such the communications interface 120 may comprise one or more transmitters and receivers, comprising analogue and digital components.

The processing circuitry 11*o* controls the general operation of the entity 8, e.g. by sending data and control signals to the communications interface 120 and the storage medium 130, by receiving data and reports from the communications interface 120, and by retrieving data and instructions from the storage medium 130. Other components, as well as the related functionality, of the entity 8 are omitted in order not to obscure the concepts presented herein.

Figure 6:
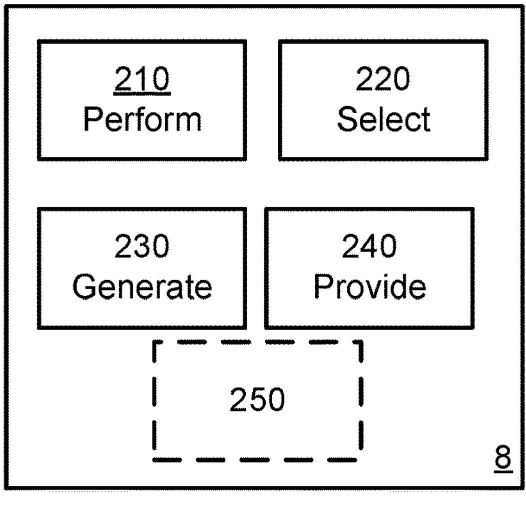
FIG. 6 is a schematic diagram showing functional modules of an entity according to an embodiment.

FIG. 6 schematically illustrates, in terms of a number of functional modules, the components of an entity according to an embodiment. The entity 8 of FIG. 6 comprises a number of functional modules; an perform module 210 configured to perform step 21, a select module 220 configured to perform step 22, a generate module 230 configured to perform step 23, and a provide module 240 configured to perform step 24. The entity 8 of FIG. 6 may further comprise a number of optional functional modules, as represented by functional module 250. In general terms, each functional module 210, 22, 230, 240, 250 may in one embodiment be implemented only in hardware and in another embodiment with the help of software, i.e., the latter embodiment having computer program instructions stored on the storage medium 130 which when run on the processing circuitry makes the entity 8 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210, 22, 230, 240, 250 may be implemented by the processing circuitry 110, possibly in cooperation with the communications interface 120 and/or the storage medium 130. The processing circuitry 110 may thus be configured to from the storage medium 130 fetch instructions as provided by a functional module 210, 220, 230, 240, 250 and to execute these instructions, thereby performing any actions as disclosed herein.

The entity 8 may be provided as a standalone device, e.g. a server such as an AAA server, or as a part of at least one further device. For example, the entity 8 may be provided in a node of an external network 5, 6. Alternatively, functionality of the entity 8 may be distributed between at least two devices, or nodes. These at least two nodes, or devices, may either be part of the same network part (such as the node of the external network 5, 6) or may be spread between at least two such network parts. In general terms, instructions that are required to be performed in real time may be performed in a device, or node, operatively closer to the entity 8 than instructions that are not required to be performed in real time. A first portion of the instructions performed by the entity 8 may be executed in a first device, and a second portion of the of the instructions performed by the entity 8 may be executed in a second device; the herein disclosed embodiments are not limited to any particular number of devices on which the instructions performed by the entity 8 may be executed. Hence, the methods according to the herein disclosed embodiments are suitable to be performed by an entity residing in a cloud computational environment. Therefore, although a single processing circuitry 210 is illustrated in FIG. 4 the processing circuitry 210 may be distributed among a plurality of devices, or nodes. The same applies to the functional modules 210, 220, 230, 240, 250 of FIG. 6 and the computer program 320 of FIG. 9.

Figure 7:
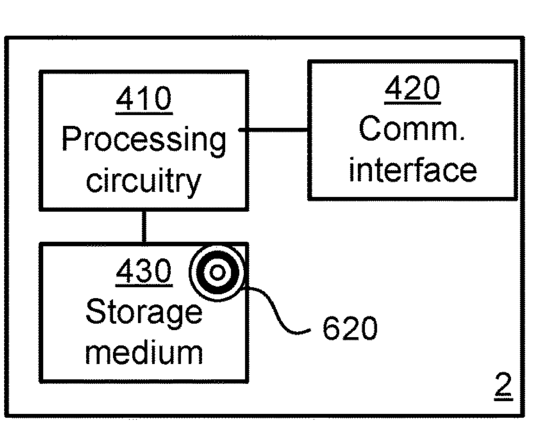
FIG. 7 is a schematic diagram showing functional units of a user equipment according to an embodiment.

FIG. 7 schematically illustrates, in terms of a number of functional units, the components of a user equipment 2 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 400 (as in FIG. 9), e.g. in the form of a storage medium 430. The processing circuitry 410 may further be provided as at least one application specific integrated circuit (ASIC), or field programmable gate array (FPGA).

Particularly, the processing circuitry 410 is configured to cause the user equipment 2 to perform a set of operations, or steps, as disclosed above. For example, the storage medium 430 may store the set of operations, and the processing circuitry 410 may be configured to retrieve the set of operations from the storage medium 430 to cause the user equipment 2 to perform the set of operations. The set of operations may be provided as a set of executable instructions. The processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The user equipment 2 may further comprise a communications interface 420 for communications with other entities, nodes, functions, and devices of the system 100. As such the communications interface 420 may comprise one or more transmitters and receivers, comprising analogue and digital components.

The processing circuitry 410 controls the general operation of the user equipment 2 e.g. by sending data and control signals to the communications interface 420 and the storage medium 430, by receiving data and reports from the communications interface 420, and by retrieving data and instructions from the storage medium 430. Other components, as well as the related functionality, of the user equipment 2 are omitted in order not to obscure the concepts presented herein.

Figure 8:
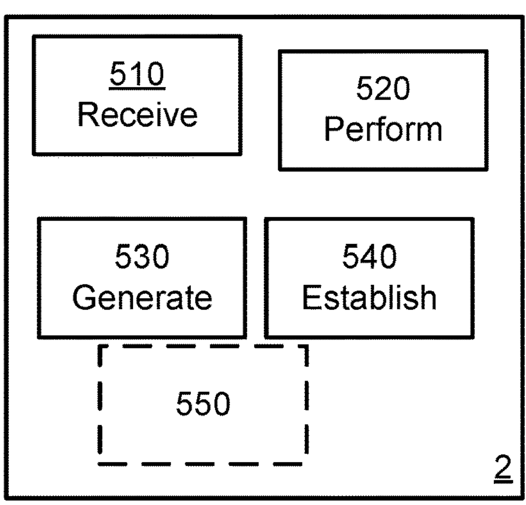
FIG. 8 is a schematic diagram showing functional modules of a user equipment according to an embodiment.

FIG. 8 schematically illustrates, in terms of a number of functional modules, the components of a user equipment 2 according to an embodiment. The user equipment 2 of FIG. 6 comprises a number of functional modules; a receive module 510 configured to perform step 31, a perform module 520 configured to perform step 32, a generate module 530 configured to perform step 33, and an establish module 540 configured to perform step 34. The user equipment 2 of FIG. 7 may further comprise a number of optional functional modules, as represented by functional module 550. In general terms, each functional module 510, 522, 530, 540, 550 may in one embodiment be implemented only in hardware and in another embodiment with the help of software, i.e., the latter embodiment having computer program instructions stored on the storage medium 530 which when run on the processing circuitry makes the user equipment 2 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 510, 522, 530, 540, 550 may be implemented by the processing circuitry 510, possibly in cooperation with the communications interface 420 and/or the storage medium 430. The processing circuitry 410 may thus be configured to from the storage medium 430 fetch instructions as provided by a functional module 510, 522, 530, 540, 550 and to execute these instructions, thereby performing any actions as disclosed herein.

Figure 9:
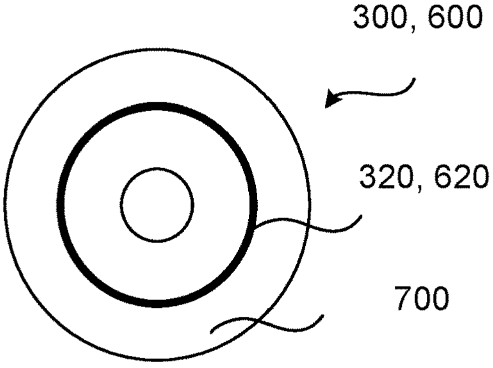
FIG. 9 shows one example of a computer program product comprising computer readable means according to an embodiment.

FIG. 9 shows one example of a computer program product 300, 600 comprising computer readable means 700. On this computer readable means 700, a computer program 320 can be stored, which computer program 320 can cause the processing circuitry 110 and thereto operatively coupled entities and devices, such as the communications interface 120 and the storage medium 130, to execute methods according to embodiments described herein. The computer program 320 and/or computer program product 300 may thus provide means for performing any steps of the entity 8 as herein disclosed. On this computer readable means 700, a computer program 620 can be stored, which computer program 620 can cause the processing circuitry 410 and thereto operatively coupled entities and devices, such as the communications interface 420 and the storage medium 430, to execute methods according to embodiments described herein. The computer program 620 and/or computer program product 600 may thus provide means for performing any steps of the user equipment 2 as herein disclosed.

In the example of FIG. 9, the computer program product 300, 600 is illustrated as an optical disc, such as a CD (compact disc) or a DVD (digital versatile disc) or a Blu-Ray disc. The computer program product 300, 600 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320, 620 is here schematically shown as a track on the depicted optical disk, the computer program 320, 620 can be stored in any way which is suitable for the computer program product 300, 600.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling end-to-end security for a communication session between a user equipment (UE), registered with a Mobile Network Operator (MNO) network, and gateway(s) and service(s) of an external network, the method being performed in an entity of the external network and comprising:

performing a secondary authentication procedure with the UE for authorizing access to the external network, selecting, for the UE, one or more of: gateway(s) and service(s) for the communication session, generating additional key material, K, based on key material generated in the secondary authentication, providing the additional key material to the one or more gateway(s) and service(s), for establishment of an end-to-end secure channel between the UE and the gateway(s) and service(s) for the communication session, providing, to the UE, a pointer to the gateway(s) and service(s) for the communication session, considering policy information relating to the UE before authorizing access to the external network, denying the access to the external network if the policy information indicates that the UE violates one or more restrictions relating to the access, and providing one of: complete access and limited access based on the policy information.

2. The method as claimed in claim 1, wherein the generating the additional key material comprises generating second key material for the gateway(s) and generating third key material for the service(s) based on the key material generated in the secondary authentication.

3. The method as claimed in claim 2, wherein the second key material and the third key material are based on different key material generated in the secondary authentication.

4. The method as claimed in claim 1, comprising providing, to the one or more gateway and the service, an identifier for selection of a correct key for establishing the secure end-to-end communication session to the UE.

5. The method as claimed in claim 4, wherein the performing the secondary authentication procedure comprises hiding the identifier from the MNO network.

6. The method as claimed in claim 1, wherein the secondary authentication comprises a 5G secondary authentication procedure, such as an Extensible Authentication Protocol (EAP) based authentication method.

7. The method as claimed in claim 1, wherein the additional key material comprises a Master Session Key (MSK), and an Extended Master Session Key (EMSK).

8. A computer program product for end-to-end security between a user equipment, UE, and a gateway of an external network, the computer program product comprising a non-transitory computer readable medium storing computer code which, when run on processing circuitry of an entity, causes the entity to perform the method according to claim 1.

9. An entity for enabling end-to-end security between a user equipment, UE, and an endpoint of one or more of an external network and service of the external network, the entity comprising processing circuitry and computer program code which, when executed by the processing circuitry, causes the entity to:

perform a secondary authentication procedure with the UE for authorizing access to the external network, select, for the UE, gateway(s) and service(s) for the communication session, generate additional key material, K, based on key material generated in the secondary authentication, provide the additional key material to the one or more of the gateway(s) and the service(s), for establishment of an end-to-end secure channel between the UE and the gateway(s) and service(s) for the communication session, provide, to the UE, a pointer to the gateway(s) and service(s) for the communication session, consider policy information relating to the UE before authorizing access to the external network, deny the UE access to the external network if the policy information indicates that the UE violates one or more restrictions relating to the access, and provide one of: complete access and limited access based on the policy information.

10. A method for obtaining end-to-end security for a communication session to gateway(s) and service(s) of an external network, the method being performed in a user equipment, UE, registered with a Mobile Network Operator (MNO) network and comprising:

receiving, from a network node of the MNO network, an identity request for a secondary authentication procedure for access to the external network, performing, in response to the identity request, a second authentication procedure with an entity of the external network, generating additional key material, K, based on key material generated in the secondary authentication, establishing, using the additional key material, K, an end-to-end secure channel to the gateway(s) and service(s) for the communication session, providing, to the UE, a pointer to the gateway(s) and service(s) for the communication session, considering policy information relating to the UE before authorizing access to the external network, denying the UE access to the external network if the policy information indicates that the UE violates one or more restrictions relating to the access, and providing one of: complete access and limited access based on the policy information.

11. The method as claimed in claim 10, comprising providing the entity of the external network with current location information.

12. The method as claimed in claim 10, wherein a Key Derivation Function is used in the generation of the additional key material, K.

13. A computer program product for end-to-end security between a user equipment, UE, and a gateway of an external network, the computer program product comprising a non-transitory computer readable medium storing computer code which, when run on processing circuitry of the UE, causes the UE to perform the method according to claim 10.

14. A user equipment, UE, for obtaining end-to-end security for a communication session to an endpoint of an external network, the user equipment comprising processing circuitry and computer code which, when executed by processing circuitry, causes the UE to:

receive, from a core network node of the MNO network, an identity request for a secondary authentication procedure for access to the external network, perform, in response to the identity request, a second authentication procedure with an entity of the external network, generate additional key material, K, based on key material generated in the secondary authentication, establish, using the additional key material, K, an end-to-end secure channel to the gateway(s) and service(s) for the communication session, provide, to the UE, a pointer to the gateway(s) and service(s) for the communication session, consider policy information relating to the UE before authorizing access to the external network, deny the UE access to the external network if the policy information indicates that the UE violates one or more restrictions relating to the access, and provide one of: complete access and limited access based on the policy information.

* * * * *